(12) United States Patent
Duddleson et al.

(10) Patent No.: US 6,879,984 B2
(45) Date of Patent: Apr. 12, 2005

(54) ANALYTICAL DATABASE SYSTEM THAT MODELS DATA TO SPEED UP AND SIMPLIFY DATA ANALYSIS

(75) Inventors: William Duddleson, Ann Arbor, MI (US); David Steinhoff, Ann Arbor, MI (US)

(73) Assignee: Clareos, Inc., Dallas, TX (US)

( * ) Notice: Subject to any disclaimer, the term of this patent is extended or adjusted under 35 U.S.C. 154(b) by 317 days.

(21) Appl. No.: 09/834,125

(22) Filed: Apr. 12, 2001

(65) Prior Publication Data

US 2002/0040639 A1 Apr. 11, 2002

Related U.S. Application Data

(60) Provisional application No. 60/238,218, filed on Oct. 5, 2000.

(51) Int. Cl.[7] .................................................. G06F 17/00
(52) U.S. Cl. .................... 707/101; 707/10; 709/201; 709/247
(58) Field of Search ................. 707/1–10, 100–103, 707/200–206; 711/170–173; 709/200–203, 247

(56) References Cited

U.S. PATENT DOCUMENTS

| | | | | |
|---|---|---|---|---|
| 5,724,573 A | * | 3/1998 | Agrawal et al. | 707/6 |
| 5,799,173 A | * | 8/1998 | Gossler et al. | 709/224 |
| 5,835,755 A | * | 11/1998 | Stellwagen, Jr. | 707/3 |
| 5,852,819 A | * | 12/1998 | Beller | 707/1 |
| 5,918,225 A | * | 6/1999 | White et al. | 707/3 |
| 5,978,577 A | * | 11/1999 | Rierden et al. | 707/10 |
| 6,539,391 B1 | * | 3/2003 | DuMouchel et al. | 707/101 |
| 6,553,366 B1 | * | 4/2003 | Miller et al. | 707/2 |
| 6,567,803 B1 | * | 5/2003 | Ramasamy et al. | 707/4 |

OTHER PUBLICATIONS

Goil et al. ("High performance data mining using data cubes on parallel computers", 1998, IEEE, pp. 548–555).*
Goil et al. ("A parallel scalable infrastructure for OLAP and data mining", 1999, IEEE, pp. 178–186).*

* cited by examiner

*Primary Examiner*—Jean M. Corrielus
*Assistant Examiner*—Joon Hwan Hwang
(74) *Attorney, Agent, or Firm*—Pillsbury Winthrop LLP

(57) ABSTRACT

An analytical database system provides access to all of the data collected by an entity in interactive time. The analytical database system transforms relational database data. The relational database is denormalized and inverted such that the data fields of tables in the relational database are stored in separate files that contain a row number field and a single data field. At least one of the files, that contains repeating data values that are stored in successive rows, is compressed. The files include files with partition values and files with analytical data. Processing of the files is distributed by creating sub-rowsets of the files and by assigning the sub-rowsets to servers. The partial result sets are merged into a complete result set.

18 Claims, 7 Drawing Sheets

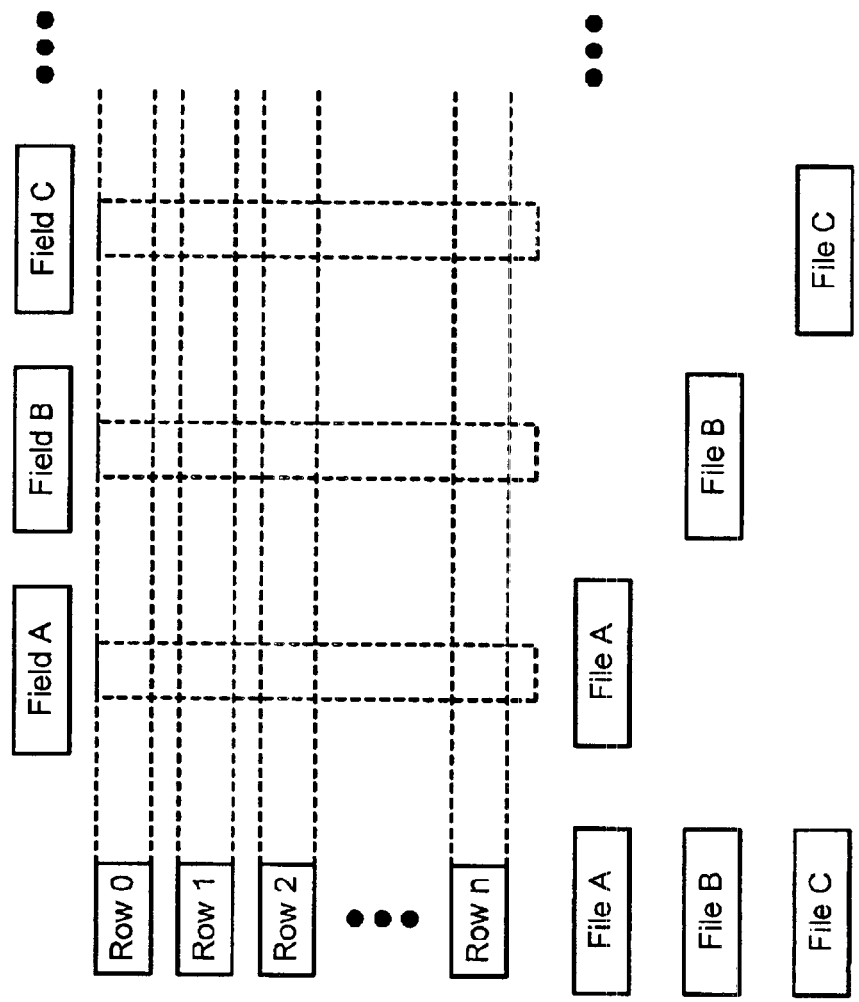

FIG. 3

| Field A | Value | Value | Value | Value | Value | Value | ••• | Value |

| Row 0 | Row 1 | Row 2 | Row 3 | Row 4 | Row 5 | ••• | Row n |

FIG. 2

| Field A | Checking | Checking | Missing | Mortgage | Missing | Savings | ••• | Mortgage |

| Row 0 | Row 1 | Row 2 | Row 3 | Row 4 | Row 5 | ••• | Row n |

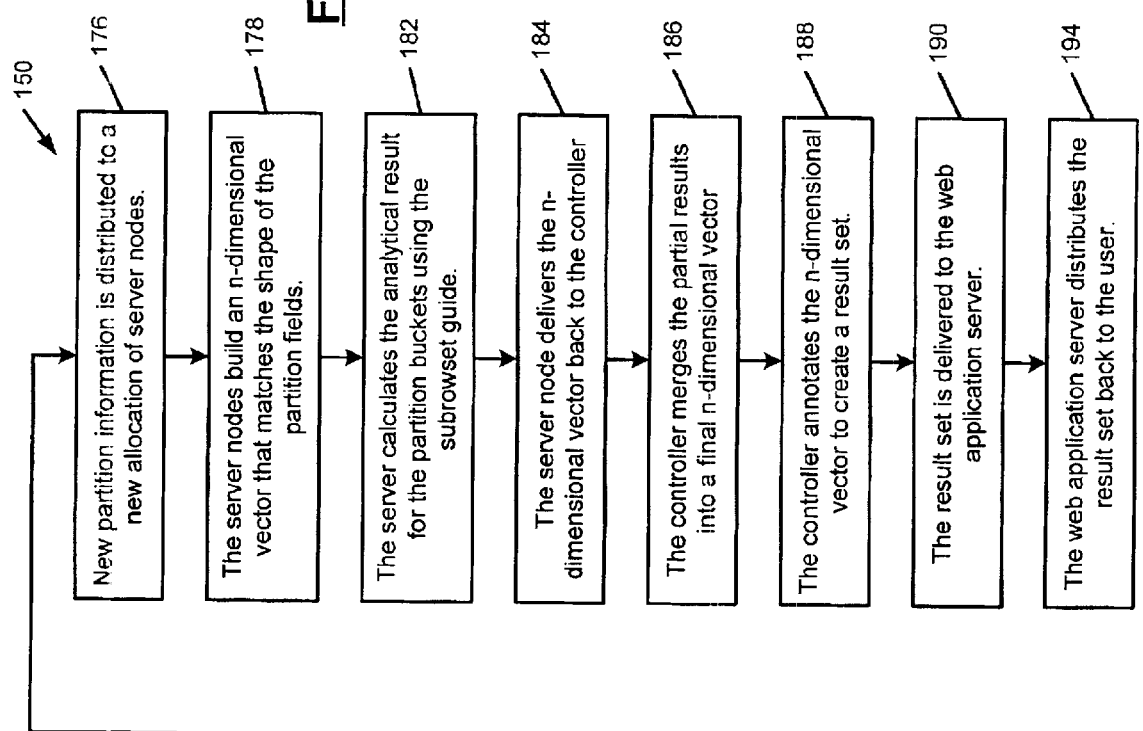
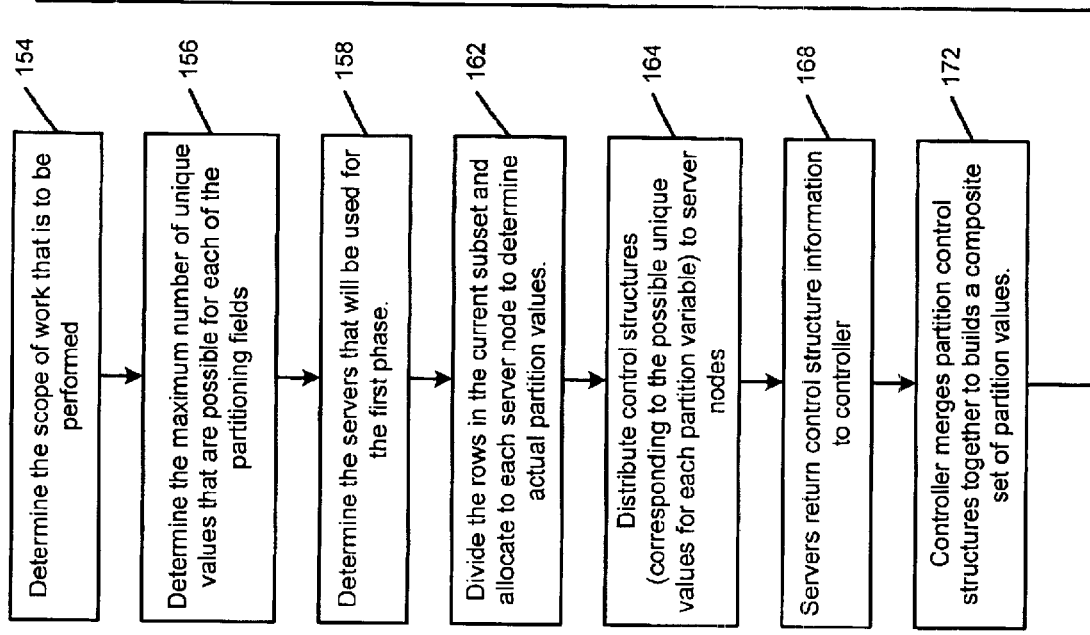
FIG. 8

ANALYTICAL DATABASE SYSTEM THAT MODELS DATA TO SPEED UP AND SIMPLIFY DATA ANALYSIS

This application claims the benefit of provisional application No. 60/238,218, filed Oct. 5, 2000.

FIELD OF THE INVENTION

This invention relates to database systems and more particularly to analytical database systems.

BACKGROUND OF THE INVENTION

A fundamental business problem is the inability to make effective use of stored data that a company collects. The data is often stored in one or more databases that are maintained by the business. One of the most valuable assets of a business is its cumulative industry experience. As a result of its experience, the business has the ability learn from prior mistakes so that it can be more efficient. To survive, the business must leverage its experience to maintain a competitive advantage. The efficiency of the business is reflected in higher margins, higher sales and/or more competitive prices.

Businesses often have too much data and not enough information. Businesses tend to repeat the same costly mistakes because of faulty assumptions. Oftentimes business managers are unable to validate their assumptions because the underlying information, while being kept by the business, is too difficult to obtain in a useable format. Despite the recent improvements in hardware and database software, most medium to large businesses fail to provide access to the business data. These businesses also lack the ability to manipulate the business data beyond the existing report formats. The inability to easily modify the existing formats often leads to uninformed and/or one-sided decision making that can cause expensive mistakes.

Typically, a business user develops a theory about a problem or ways to improve the business and desires to confirm the theory. The business user submits a request for a new business report to the information technology (IT) personnel. Oftentimes, it takes the IT personnel several weeks or months to fulfill the request. After reviewing the new report, the business user realizes that a different report is needed. Alternatively, the business user has additional questions that are not answered by the new report. The business user returns to the IT personnel and makes another request for a new report. Several weeks or months later, the IT personnel provide a revised report. This process continues for several iterations until the business user is satisfied, the business user gives up, or the IT personnel refuse to create additional reports. Because of the time delays that are involved, the business user often gives up trying to validate theories relating to problems or potential ways to improve the business. Alternatively, the business user implements an untested theory with potentially negative results.

Most business analytical systems provide interactive access to subsets of the data within an enterprise. These business analytical systems typically require the intervention of IT personnel to create or change the reports. Most of the time, the reports are not presented in a fashion that can be comprehended by a typical business user having spreadsheet skills. The analytical systems also typically require predefined queries. In addition, these analytical systems require the user to perform data manipulation, computation and display using a data investigation program and to use a different report preparation and dissemination program.

Businesses keep their data in data stores such as legacy systems, data warehouses, data cubes and data marts. Each of these types of data stores performs some of the desired functions. However, all of the conventional data stores have fundamental flaws. None of the conventional data stores provide a broad, flexible system for allowing business users to access all of the data within the organization.

Legacy systems were typically written using older database technology. The legacy systems are maintained because they still adequately serve their specific, original purposes. Many of these legacy systems originated at a time when data systems served very specific and limited business purposes. The legacy systems do not meet the needs of the recently developed, general-purpose business analytical systems. The legacy systems do not attempt to address the type of flexible business analysis that businesses need to remain competitive.

Data warehouses were developed to consolidate data storage. Data warehouses are fed by multiple databases and other data sources. The data from these sources is consolidated into one data store. Data warehouses are typically implemented in commercial relational database management systems, such as Oracle®.

Data warehousing held out the promise of being the model for general-purpose business analysis. Data warehouses collect all of the relevant data from various systems, databases and other data sources in one place. Data warehouses have advantages over prior systems that are distributed across multiple, incompatible legacy systems. Data warehouses, however, fail to provide an adequate business analysis tool. The data structures of a typical corporate data warehouse are much too complex for a typical business user to understand. As data warehouses grow, the response time for reporting purposes is too slow to qualify as "interactive time". As a result, the business user is now as dependent as ever on the IT personnel to define, create, modify, and maintain database access and report generation programs. As previously discussed above, this is an untenable situation because the business user does not know in advance what data and report formats that he or she will need to see.

Data cubes and data marts were created to address user problems relating to accessibility of data in data warehouses. Data cubes and data marts address the structural complexity of the data structures and the slow response times. Data cubes and data marts create either aggregates (so-called dimensional databases) and/or subsets of a full database that are accessed through a user-friendly interface. Many also include excellent business analysis tools for data manipulation and display. The data cubes and data marts do not however, contain all of the data of the business. The data cubes and data marts contain aggregates and/or subsets of the underlying database and can only respond to a limited set of queries that relate to the selected subsets of data.

In practice, the IT personnel and the business users need to spend a considerable amount of time designing the data marts and data cubes and discussing the content and structure of the cubes. Oftentimes, because the IT personnel lack sufficient knowledge of the business, the IT personnel have a difficult time understanding what the business user needs. Despite the planning time, the business user has difficulty anticipating the business questions that he or she is going to ask prior to having useable access to the data. This situation often results in several versions of the data cubes and data marts. Between the versions, however, are significant organizational delays. The time delays are exacerbated by the rapidly changing state of available data and associated business metrics. In practice, the data cubes and data marts are being overwhelmed by the dynamism of business change, which is fueled by the competitive business environment and the explosion of electronic commerce.

Therefore, a business analysis system that provides unlimited access to all of the business data within "interactive time" would be desirable. The business analysis system should also allow business users with moderate skill to work independently of IT personnel. The business analysis system should also provide manipulation, computation and display tools.

SUMMARY OF THE INVENTION

A method and apparatus according to the invention provides analytical business reports that are based on relational database data. The relational databases include tables each with a plurality of data fields. The relational database is denormalized and inverted such that the data fields of tables in the relational database are stored in separate files that contain a row number field and a single data field. At least one of the files is compressed.

In other features of the invention, the step of compressing is performed on files that contain repeating data values that are stored in successive rows. The files include a first file with partition values and a second file with analytical data.

In still other features of the invention, processing of the first file is distributed by creating sub-rowsets of the first file and by assigning the sub-rowsets of the first file to a first set of servers. The first set of servers identifies unique partition values contained in the sub-rowsets. The unique partition values identified by the first set of servers are merged. The merged partition values are transmitted to a second set of servers. The second file is processed for the merged partition values by creating sub-rowsets of the second file and by assigning the sub-rowsets of the second file to the second set of servers. The second set of servers performs calculations on the sub-rowsets and creates partial result sets. The partial result sets are merged into a complete result set.

In still other features of the invention, the result set is annotated and transmitted to a client computer. At least one of the compressed files is directly traversed while the compressed file is stored in memory. Business user requests for the business reports are received via a browser of a computer that is connected to a distributed communication system. Report for the business reports from multiple business users are distributed over a plurality of web application servers using dynamic binding.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 illustrates a denormalized and inverted table that is stored as Files A, B, and C;

FIG. 2 illustrates a file containing partition values;

FIG. 3 illustrates a file containing analytical data values;

FIG. 8 illustrates steps performed by the analytical database system to create business reports.

DETAILED DESCRIPTION OF THE PREFERRED EMBODIMENTS

Figure 4:
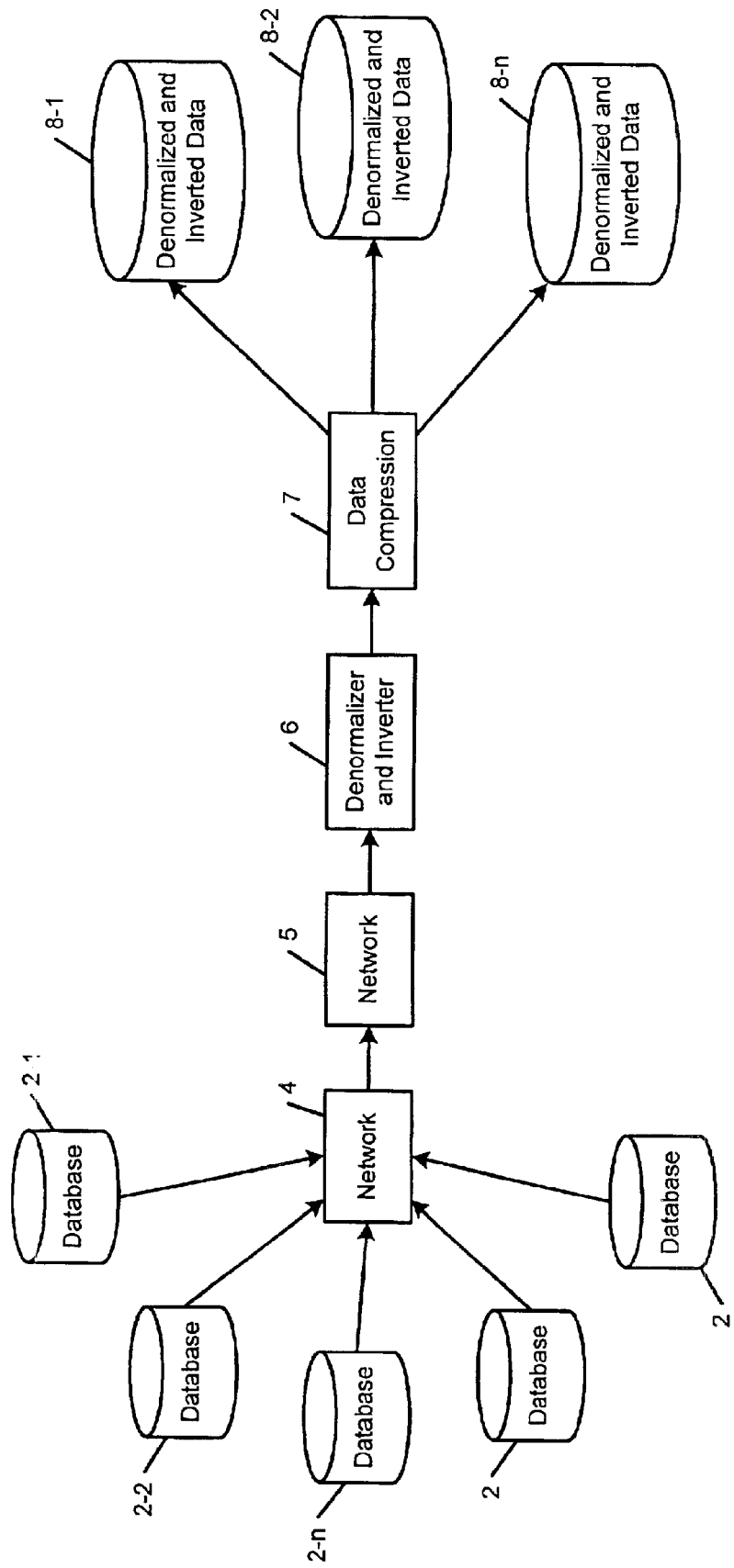
FIG. 4 illustrates an exemplary system for denormalizing and inverting relational database data.

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The analytical database system according to the present invention employs a combination of techniques that involve both data structures and hardware utilization. The analytical database system transforms a customer's data into a modified form. In the modified form, the database is denormalized and inverted. Then, the data is compressed. Individual fields of each table are stored in separate files along with row position. The files are sized such that the time necessary to access and process each file will not exceed a desired response time of the system.

The analytical database system reads and processes the data in the modified form. The analytical database system reads only a minimal amount of data that is necessary to fulfill a data request from a business user. The analysis database system performs all operations in memory including direct traversal of compressed data structures. The analytical database system distributes the database reading and processing across a variable number of servers. The time necessary to read and process the data that is assigned to one of the servers does not exceed a desired response time of the analytical database system. The analytical database system executes applications in a pipeline fashion. In other words, phases of application are overlapped such that processing delays are reduced. This allows different stages of the analysis to be performed simultaneously and in parallel.

The analytical database system employs a data organization strategy in which each field in a database is stored separately in an inverted and fully de-normalized fashion. Referring now to FIG. 1, an exemplary table includes n rows and three fields. Fields A, B, and C are all stored in separate (inverted) files that are designated files A, B, and C, respectively along with a row number. The analytical database system loads only the files that are associated with the fields that are required for the database analysis that is requested by the business user. Thus, if the analysis requested by the business user involves fields A and C, the analytical database system does not incur any input/output (I/O) or execution overhead that would be associated with field B. Field B does not need to be referenced or otherwise looked at during the execution of the analysis requested by the business user.

The rows (such as row n) have an index (i.e., the row number) that maps onto the nth element in each of the files. If the analytical database needs to access row n, the analytical database system must load data from files A, B and C. By their nature, business analysis applications are interested in computational and statistical aspects of fields, not rows. The need to load all of the fields in a row is therefore extremely rare in analytical operations that will be performed by the analytic database system.

In other words, the inverted representation stores fields as files and allows each data field in a table to be represented in a specialized way that may be different from any other field in the table. This makes it possible to optimize data storage for different purposes. Advantages include the ability to make the data more accessible, to reduce the size of the data, and to optimize the representation for data types and usage.

Fields are used in the following general ways, which tend to correspond well to representation strategies that minimize unnecessary storage and maximize access and throughput speeds for the data. Partition fields are used to construct dimensions in which analytical values are projected for a given analysis. Partition fields typically have relatively low number of unique values. The partition fields also tend to fall into sequences in which a given partition field value repeats many times. Partition fields compress well. Analytical fields are almost always numeric, and tend to have very few repeated values. That is, nearly all values in an analytical field are unique. Analytic fields do not compress well. Descriptive or categorical fields are those that are used for neither of the above purposes, but are used mainly as subset criteria. For example, all records with zip codes in the range 48000 to 49000. Descriptive or categorical fields are used to create custom range specifications in reports, or to augment individual record detail in record listings. For example, partition fields can be the 52 states and a descriptive or categorical field groups the 52 states into sales regions such as East, West, North and South.

Referring now to FIG. 2, some data fields contain relatively few discrete (unique) values and are most often used to partition analytical results into categorical sub-totals. One common purpose for these fields is to designate record type or record sub-type qualifications. For example, a bank record may have a field called "Account Type", which may contain only values such as "Savings", "Checking", or "Mortgage". In this case, there will never be a value other than these three (plus "Missing"). Given the small number of possible values and the large number of records in the database, a great deal of repetition is likely to be encountered where the value in a row is the same as the value for this field in the previous row. There are often very long runs of consecutive identical values that naturally occur in a database for such fields even when the Table is unsorted. The table of unique values is maintained separately from the row indexes (ordinals). File compression techniques are used to compress the files. In a preferred embodiment, Run-Length Encoding (RLE) issued to reduce the amount of disk space and RAM that is needed to accurately represent all of the values for the field in very large databases. In a preferred embodiment, RLE is used to compress the inverted files. Compression on categorical fields typically ranges from 70% to 99.99%.

Reductions in file size translate into storage savings and runtime input/output (I/O) transmission time savings. Storage savings in RAM permit more fields to be loaded into computer memory. Having more fields in memory increases the speed of execution for the application. These fields are interpreted in their compressed representation during application processing and are not expanded. The reductions in the I/O transmission time allow greater amounts of information to be passed on to the network, resulting in more information being handled in a given amount of time. Both savings result in more efficient use of the physical resources of the computer (e.g. processing and memory) so that more users get their results more quickly.

Referring now to FIG. 3, other types of fields show very high incidence of unique values. These are typically "analytical" or "descriptive" fields. Analytical fields are most commonly the fields that are measured by an application. In some cases, every value is unique (for example, "Account Balance"). A simple sequential representation is used to represent these fields, since separate tables of ordinals and unique values would be prohibitively large. In the sequential representation, each value is explicitly represented in a single table that combines the features of ordinals and values.

Descriptive fields are typically used to augment or document reports that reference individual data records. For instance, a "record listing" command shows the descriptive value (and all other requested values) for every data row included in the listing. A "data export" command operates similarly, but creates a file in an external format with the same information. Descriptive fields are also used for sub-setting purposes. For example, a field containing zip codes may be used to constrain the population of a database for more focused analysis. It is more efficient to store descriptive fields using the ordinal/unique table combination in order to satisfy both of these types of command uses.

The data structures and representation techniques discussed above have the obvious effect of reducing the amount of storage that data occupies. Less obvious is that the structures are also ideally suited for distributing data and processing responsibilities across multiple servers. In the analytical database system 10, each field is represented by a file and the index that ties rows together across multiple files is simply the row number in each file. This permits the files to be distributed arbitrarily without compromising the informational integrity of the database. In the end, work on a database can be distributed across any number of independent processors that are controlled by the architecture of the analytical database system. A parallel-processing computer, however, is not necessary to realize the benefits of the distributed database.

Referring now to FIG. 4, an exemplary system 2 for transforming the data from the relational databases 3-1, 3-2, . . . , 3-n in their standard relational format to denormalized, inverted and compressed format is shown. The databases 3 are connected to one or more networks 4 that are associated with the business. A local or remote network 5 is connected in any suitable manner to the network 4. The networks 4 and 5 can be local area networks, wide area networks, networks connected by the Internet, satellites, other terrestrial networks, etc. A denormalizer and inverter module 6, which is preferably implemented in software, converts the data from the relational databases 3 to denormalized and inverted data. The conversion can take place continuously or in batch mode. A data compression module 7 compresses the denormalized and inverted data. The compressed, denormalized and inverted data is stored in one or more data storage units 8-1, 8-2, . . . , 8-n.

Figure 5:
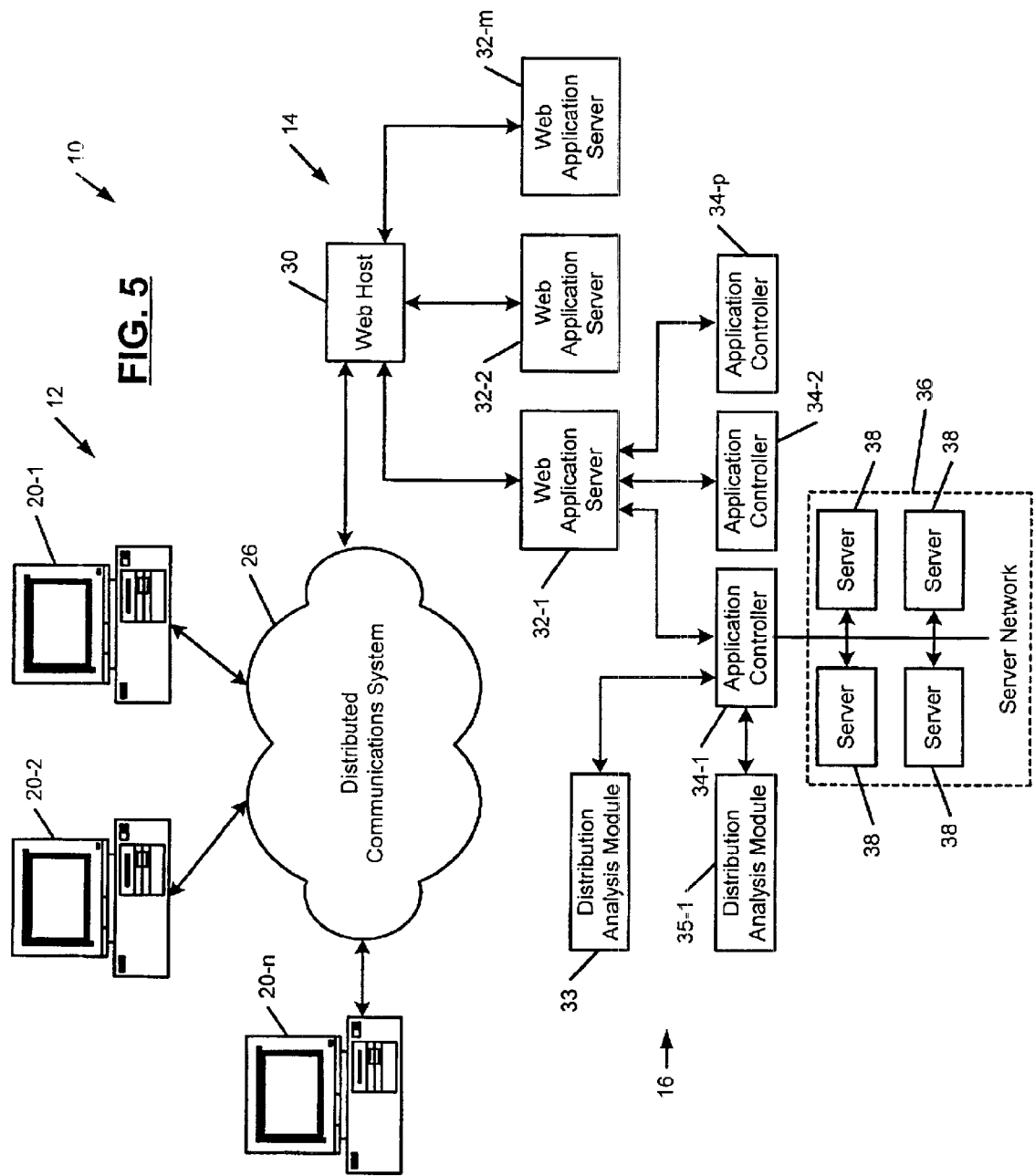
FIG. 5 illustrates an analytical database system according to the present invention.

Referring now to FIG. 5, the analytical database system according to the invention is shown and is generally designated 10. The analytical database system 10 includes a client tier 12, a middle tier 14 and a server tier 16. The client tier 12 includes one or more computers 20-1, 20-2, . . . , 20-n with standard desktop browsers that adhere to published standards. At present, the published standards include HTML, PNG, and/or JavaScript® content processing. Proprietary plug-ins, extensions, Java® or Java® classes, and/or other applications are not required on the client computers 20. The client computers 20 are preferably connected to a distributed communications system 26. The distributed communications system 26 can be a private network, a private network that is connected to a public network such as the Internet, an extranet or a public network such as the Internet. The distributed communications system 26 can be connected to the client computers 20 in any conventional manner such as cable connections including coaxial cable and/or fiberoptic cable, satellite connections, terrestrial-based connections, radio frequency (RF) connections, or any other suitable connection.

The client computers 20 are connected through the distributed communications system 26 to the middle tier 14. The middle tier 14 includes a web host 30 and one or more web applications servers 32-1, 32-2, . . . , 32-m. The web host 30 is connected to the distributed communications system 26. The web host 30 authenticates the business user through a conventional login process that requires a registered user identification and password. Other forms of security may be employed as well.

The analytical database system 10 audits all business user logins to track and monitor product utilization and client usage patterns. The user logins are preferably used for billing purposes as well. The web host 30 of the analytical database system 10 allocates users to a web application server 32 based on dynamic binding. Dynamic binding isolates clients to shared-dedicated resources for any given session and permits flexible system load balancing over time. Once the business user is logged in, the client computer 20 sends application report specifications created by the business user to the middle tier 14.

The middle tier 14 analyzes the application report specifications sent by the business user and distributes them to the server tier 16 for execution and result set generation. The middle tier 14 is responsible for dynamically converting result sets into graphical or tabular format, and creating and posting pages back to the user with the results. The result web pages are displayed by the browser of the client computer 20. The server tier 16 manages data, runs software that analyzes the data, and generates result sets.

Report specification commands are received by the server tier 16 from the middle tier 14. The report specifications are typically a result of interactive user action and/or are retrieved from a stored off-line request queue manager 33. The stored off-line request queue manager 33 schedules preset time-based batched execution orders, or automatic internal processes to perform data mining tasks or system-level data verification. The server tier 16 uses a distributed paradigm with controllers and managed resources as will be described further below.

The server tier 16 includes application controllers 34-1, 34-2, . . . 34-p that include a distribution analysis module 35 that determines how a result set will be distributed to the servers 38. The application controllers 34 are connected to a server network 36 with one or more servers 38 that operate in a hierarchical and cooperative manner to allocate tasks efficiently. The data is distributed across storage media and accessed in a segmented manner by the servers 38 during application processing. The results of commands are incorporated into a result set that contains a structured multidimensional vector (i.e., a cubelet) and annotation information (metadata). The result set is delivered back to the middle tier 14 for visualization preparation and subsequent distribution back to the client tier 12 (i.e. the requesting user). In addition, the results are cached for incremental drill-down investigation, and may be stored for retrieval during a later interactive session.

Figure 6:
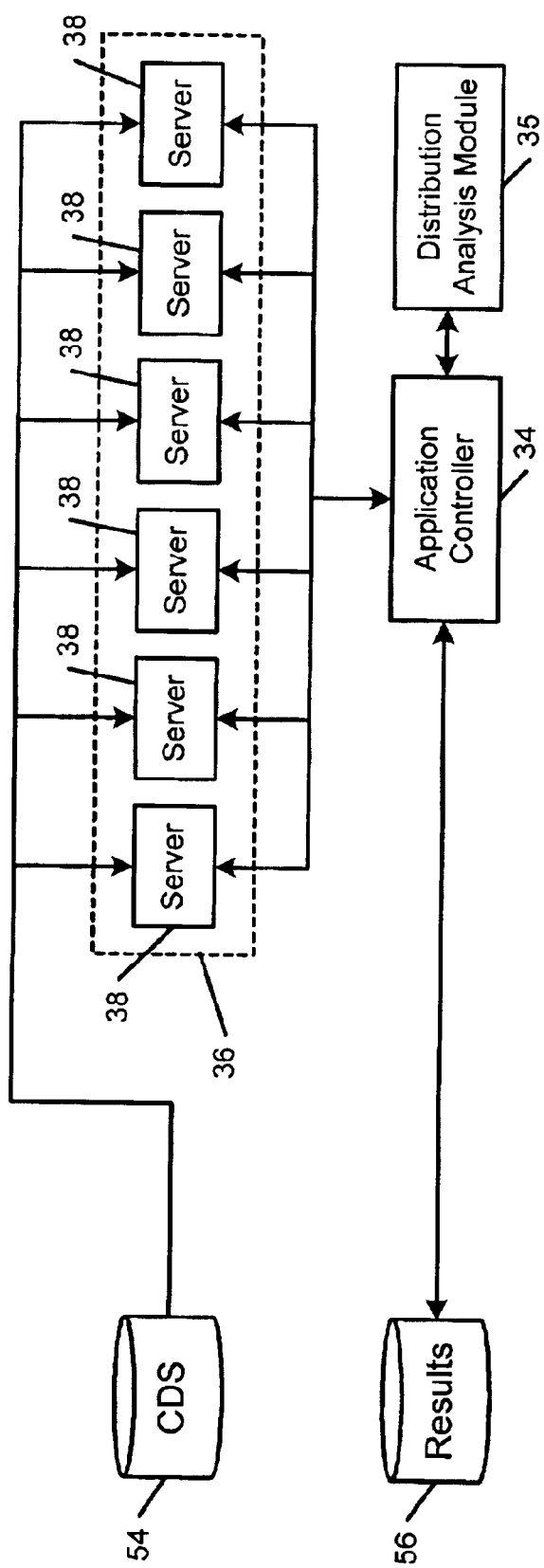
FIG. 6 illustrates an application controller, servers, storage and a distribution analysis module of the analytical database system.

Referring now to FIG. 6, the server tier 14 includes three types of devices: application controllers 34, the server network 36 including one or more servers 38, and centralized storage devices 54 and 56. Effective distribution of data is very important to the speed of execution provided by the analytical database system 10. Through distribution, I/O and processing tasks are allocated across multiple servers to ensure that the task of any given server does not take longer than the desired response time of the system. Distribution and allocation of data to servers 38 is accomplished in several different ways.

The underlying technique that permits distribution across multiple servers is the use of inverted files. Once the files are inverted, the physical locations and structures of files are no longer tied to their logical relationship to each other. Any file can be anywhere and may be compressed in the most efficient fashion for purposes of reading and basic processing.

The central data storage 54 contains files and can be accessed by all of the servers 38 or access can be restricted to one or more server networks 36. Thus, a given server will be assigned by one of the application controllers 34 to read and process all (or part of) a particular file. The assignment that is made by the application controller 34 depends upon the file's size, the availability of the server 38 and/or the accessibility of the file to the server 38.

For additional distribution, the server 38 is assigned responsibility for less than an entire file when the I/O and processing of the file is estimated to take longer than the acceptable response time. When the file is large enough, a first server 38 is responsible for the partition (sub-row set) rows 1 to a. A second server 38 is responsible for rows a+1 to b. A third server 38 is responsible for rows b+1 to c. Additional servers 38 and/or server networks 36 are assigned tasks until the entire file has been allocated across the requisite number of servers 38. The application controller 34 is responsible for determining the size of the sub-row sets such that I/O and processing occur in the appropriate amount of clock time.

The application controllers 34 communicate with the middle tier 14 to receive command specifications and to deliver the results. The application controllers 34 analyze the command specifications for the various types of information. The application controllers 34 determine which application or applications need to be run. This analysis yields a sequence of sub-application components that are executed serially or in a pipelined semi-parallel manner by the server 38. The application controller 34 analyzes what rowset (i.e., what subset of the rows in the database) applies to the individual components. The current subset is used to determine the actual rowset that are referenced in the application (s).

The application controllers 34 also analyze the priority level for the execution of the report. Different types of reports are allocated to different machines based on application priority (e.g., record listing is a lower priority, high data-intensive application). The application controllers 34 determine the concurrency aspects of each component before the component is allocated to servers 38 for execution. Some components are executed in a single pass on a single server 38. Other components are distributed across multiple servers 38 for concurrent execution. In other words, as a precursor to the distribution of the component, each resource is assigned a sub-rowset of the total rowset required by the component.

The pipelining and multi-stage concurrency opportunities for the application are analyzed to take advantage of overlapping processing. Some applications that require multiple stages are able to execute the stages semi-autonomously.

Bottlenecks are avoided until later stages become starved for input. After execution, the application controllers 34 merge all partial result sets from each resource into a total result set. The application controllers 34 return the total result set to the middle tier 14 for application post-processing and delivery to the client tier 12.

The servers 38 perform the I/O and data aggregation portion of the application execution. The server 38 are the only component in the analytical database system 10 that actually load and interpret the physical data in the database. The data is combined with the control logic of the analytical operation to yield the particular type of result set that is required by the command specification. Servers may be multi-processor machines. A given server 38 can also subdivide its portion of the application into sub-threads, which are executed in parallel on the same machine. Sub-threads on the server 38 work on a single result set; therefore, the servers 38 are not the same as the application controllers 34.

Processing of data requires a variety of strategies for loading and manipulating the actual contents of the database. Loading strategies are based on block I/O operations that load large (contiguous) elements from local or centralized (remote) storage units. The loading strategy includes loading all of the data for a given field at once. The data is buffered in row-span chunks. LRU and circular buffering techniques are used to expire in-memory data. The data is traversed and manipulated in compressed or otherwise minimized representations. "Least cost" loading of data segments is employed to avoid loading parts of the data for a field that are not required for the current operation. Shared data management that is local to each server minimizes replication of data in memory by discrete processes that are operating on the same field(s).

Control strategies are applied to minimize reloading of data that is already present in memory. That is, the server 38 that has loaded the data for a given field reports statistics related to the "cost of loading" the data to the application controller 34. The application controller 34 factors in the cost when distributing later commands that use the same data in order to eliminate redundant loads. Servers 38 also notify the application controller 34 when the data has been unloaded from memory. Manipulation of the data in memory is based on a closely coupled relationship between data representation and the techniques to traverse and otherwise evaluate it.

The CDS 54 is the general repository for all user data. However, the data may also be distributed to individual servers 38 both dynamically and statically. The CDS 54 is also responsible for caching results in either archival form or for dynamic interrogation. The CDS 54 provides massive, high-performance disk storage. The CDS 54 provides high performance network and point-to-point peer interfaces to transfer data sequentially at high speeds. The CDS 54 provides redundancy and failover capability to guarantee constant data availability. Broadcast capabilities of the CDS 54 permit data to be distributed widely to nodes within a sub-net in parallel fashion. The CDS 54 has multiple gateway access for communication with global storage resources for data updates/backups.

Figure 7:
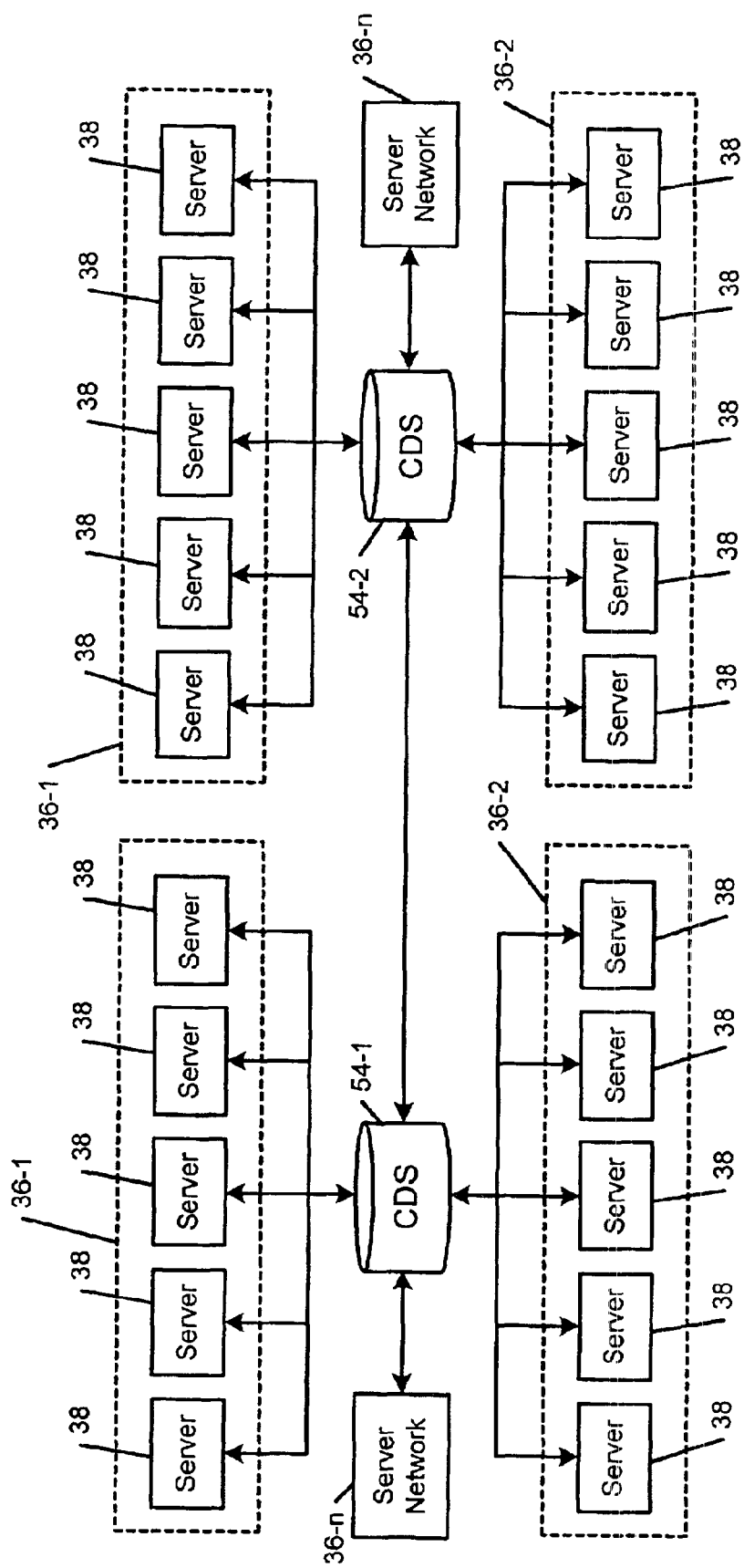
FIG. 7 illustrates multiple server networks connected to data storage.

The CDS 54 provides an archive for pristine data for all databases that are available for analysis within the analytical database system 10. Referring now to FIG. 7, the relationship of the CDS 54 to the servers 38 is illustrated. Multiple CDS 54-1, 54-2, . . . 54-n are interconnected. Each CDS 54 can be connected to one or more server networks 36-1, 36-2, . . . , 36-n. The number of servers 38 that may be connected to the CDS 54 is unlimited. The number of CDS 54 in the analytical database system 10 is also unlimited.

Data is allocated to different nodes according to priority, type, and size. The combined resources of the server tier 16 are all used during the execution of an application. A simple crosstab report, which is a basic business analysis, is the most typical application report that is generated by business users. Other applications require only a single stage or more than two stages. While the actual logic flow for different applications varies from what is described below, skilled artisans will appreciate that the control model is similar. Referring now to FIGS. 8 and 9, steps for creating a crosstab report are illustrated and are generally labeled 150. In step 154, the application controller 34 determines the scope of work that will be performed. The scope of work is the number of serial stages required to yield the result set. In the case of a crosstab report, the scope of work consists of three steps. In the first step, the application controller 34 determines the set of rows (sub-rowset) against which the results will be computed. In the second step, the application controller 34 determines the shape of the results grid and creates the partitions within the grid. In the third step, the application controller 34 computes the analytical results for each cell in the results grid.

The determination of the sub-rowset in the first step for the current command is accomplished by retrieving the results of the most recently executed subsetting operation from storage. This information is used to guide the distribution of execution across the servers 38. When all eligible rows in the data table are included in the crosstab command, the application controller 34 assigns approximately equal numbers of rows to each server 38 that will be used. For example, if the data table contains 100,000,000 rows and the distribution analysis module 35 assigns four servers to the command, the assignment of rows will be as follows: Server1: rows 1–25,000,000; Server2: rows 25,000,001–50,000,000; etc. In the case where a subsetting operation eliminates some of the eligible rows from inclusion in the command, the distribution analysis module 35 assigns approximately equal numbers of rows from the resulting sub-rowset to each of the servers.

In step 156, the application controller 34 and the servers 38 determine the unique values that are possible for each of the partition fields. In performing step 158, the application controller 34 and the servers 38 examine the partition fields to determine the maximum number of unique values that the partition fields include. This analysis is performed only on partition fields on which the report is based and on observations of values in the data. Users may also provide a set of "custom ranges" for the partition field, which overrides the execution of this step. The underlying structure of the results grid is arrived at by analyzing the partition variables to determine the number of cell positions that each partition variable requires.

In the first step of this analysis, the maximum number of unique values (i.e., cells) that each partition variable can contribute is retrieved from the metadata. The upper bound for the combined number across all partition variables is determined by multiplying together the number of unique values found for each individual partition variable. For example, a crosstab report partitioned by Gender (2: male, female) and AgeGroup (3: 0 to 30, 31 to 70, 71+) has an upper bound of 6 cells. This is a small grid that uses a direct and simple Cartesian mapping structure with cells for all possible combinations of the values each partition allows. It is possible that some of the cells will not be populated (for example., there may be no males between the ages of 31 and 70). The unpopulated cells are removed from the grid structure following the execution of the second stage, as will be described further below.

More complicated grid structure is required when very large numbers of values are possible for one or more partition variables. In this case, the application controller 34 assigns the servers 38 the task of finding out which values actually occur in the sub-rowset. The partition grid is built using only those values. The grid structure uses a direct Cartesian mapping for all values in the grid unless the number of cells exceeds a system-programmed maximum or unless the resulting grid structure is large and sparsely populated due to the permuted combined size of all partitions. For example, in a data table containing bank account information, if the partition variables are branchID (cardinality 1000) and customerID (cardinality 7,000,000), the grid potentially contains 7,000,000,000 cells. However, if no customer has accounts in more than one branch, then only 7,000,000 cells are populated, though the cells will be sparsely distributed across 1000 branches. In this case, the grid is constructed with 7,000,000 cells and an index is created to correctly associate each cell with both a customerID and a branchID. Other grid constructions suited to additional special conditions are used to maintain an efficient and compact representation of the results for any command.

In step 158, the application controller 34 determines which servers 38 that will be used for execution of the first phase. In performing step 158, the application controller 34 requests the number of servers 38 that are deemed appropriate to carry out the stages of the command. The distribution analysis module 35 examines available server resources and determines if the requested number of servers 38 are available. The decision of how many servers 38 to allocate is based on factors such as availability of the servers 38, the complexity of the command, and the size of the sub-rowsets that are to be analyzed.

Step 162 is executed when the partitioning analysis requires that the actual number of unique values in one or more of the partitioning variables must be determined. In step 162, the application controller 34 creates an approximately equal division of the total number of rows and allocates balanced sub-rowsets to each server 38 to determine the actual partition values. The rowset is divided up into sets of substantially equal numbers of rows such that each of the servers 38 performs partition calculations on the same number of rows and, as a result, have roughly equal processing time. The split doesn't have to be perfectly equal, but that is a reasonable objective. Having a relatively balanced distribution of calculations across the servers 38 is sufficient.

In step 164, the application controller 34 distributes control structures for the unique values for each partition variable to the servers 38 along with the sub-rowsets. The application controller 34 sends the sub-rowsets and the control structure of the partition fields to all of the servers 38 that are used.

In step 168, the servers 38 return the calculated partition control structure to the application controller 34. In step 172, the application controller 34 merges all of the calculated partition control structures together and builds a composite master set of partition values. The fully merged control structures represent the actual values of the partition fields that are present in the current report. The actual size of each dimension and the overall size of the result set can be directly calculated from this information. This information may be used to constrain the size of any given partition so that the number of distinct partition values or buckets it contains does not exceed a system- or user-specified limit. The command fulfillment may, in fact, be aborted at this point if the total number of partition values in the report exceeds a predetermined limit. The result of the merged control structures is the grid structure that is used for the calculation of the analytical results. When the grid structure is based entirely on the maximum possible number of unique values, the grid is preferably trimmed to eliminate cells that do not correspond to actual observations of partition values in the data.

In step 176, the new partition information is distributed to a new allocation of servers 38. In step 178, the servers 36 build an n-dimensional vector (i.e., the grid) that matches the shape of the partition fields, along with the sub-rowset. The combined partition field information determines the grid 'shape' that corresponds to the dimensions of the n-dimensional vector into which the analytical results are generated. This information is allocated back to a set of server nodes, and is also saved in storage for use later. In other words, the shape of the grid is a unique identification and is cached for later reference. The servers 38 use the sub-rowset to perform the specified analysis on the rows that it is delegated.

In step 182, the server 38 calculates the analytical result for the partition values or buckets using the sub-rowset guide. The server 38 creates an n-dimensional vector corresponding to the shape of the analysis. The server 38 loads the appropriate portions of the analytical variable corresponding to the sub-rowsets assigned to it and calculates the values for every cell in its n-dimensional vector. The shape of the n-dimensional vector is identical for each server 38, but is referred to as a "partial vector" because it includes results for a subrowset, rather than the entire rowset.

In step 184, the server node 38 delivers the n-dimensional vector back to the application controller 34. In step 186, the application controller 34 merges all of the partial results into a final n-dimensional vector. In step 188, the application controller 34 annotates the n-dimensional vector to create a result set. The annotations include suitable titling and labeling information. The n-dimensional vector and annotations together form the result set. At this point the execution of the sample application has been completed. The application controller 34 performs additional housekeeping tasks, such as streaming the result set to storage and updating its control information with information about where data is cached in memory or stored in servers 38 during the execution of the application.

In the step 194, the result set is delivered to the web application server 32 for distribution back to the client computer 20. The web application server 32 converts the result set into the appropriate web pages for display on the user's desktop or otherwise distributes or stores the results according the application specification that was originally received.

As can be appreciated from the forgoing, the analytical database system according to the invention provides access to all of the data of the business within interactive time. The users with spreadsheet skills have access to the data without requiring the assistance of IT personnel.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. A method for providing an analytical business report that is based on data including data from tables, each table including a plurality of rows and a plurality of columns, each of the plurality of columns corresponding to a data field, the method comprising:

inverting said data such that said data fields are stored in separate files that include a row number field and data values corresponding to a single data field, wherein said files include at least a first file with a partition field and a second file with an analytical field;

compressing at least one of said files, including files containing repeating data stored in successive rows;

traversing said at least one of said compressed files while said compressed file is stored in memory to directly retrieve data stored in said compressed file without decompressing said compressed file;

using said retrieved data to generate said analytical business report;

processing said partition field by creating sub-rowsets of said partition field and by assigning said sub-rowsets of said partition field to a first set of servers, wherein said first set of servers identify unique partition values contained in said sub-rowsets;

merging said unique partition values identified by said first set of servers;

transmitting said merged partition values to a second set of servers; and processing said analytical field for said merged partition values by creating sub-rowsets of said analytical field and by assigning said sub-rowsets of said analytical field to said second set of servers.

2. The method of claim 1 further comprising the steps of:
performing an analytical function using said second set of servers to create partial result sets; and
merging said partial result sets into a complete result set.

3. The method of claim 2 further comprising the step of:
annotating said complete result set.

4. The method of claim 3 further comprising the step of:
transmitting said complete result set to a client computer.

5. The method of claim 1 further comprising the step of:
receiving business user requests for said business reports via a browser of a computer that is connected to a distributed communication system.

6. The method of claim 5 further comprising the step of:
distributing said business user requests from multiple business users for said business reports over a plurality of web application servers using dynamic binding.

7. A system for providing an analytical business report that is based on data including data from tables, each table including a plurality of rows and a plurality of columns, each of the plurality of columns corresponding to a data field, comprising:

a data storage device that stores denormalized and inverted data in separate files that contain a row number field and data values corresponding to a single data field, wherein said files include at least a first file with a partition field and a second file with an analytical field;

a client computer that requests a business report that requires a calculation involving said first file and said second file;

an application controller that is responsive to said request from said client computer;

a plurality of servers connected to said data storage device and said application controller, wherein said application controller distributes portions of said calculation to said servers, merges partial result sets that are generated by said servers and transmits said merged result sets to said client computer, wherein said first file is compressed, wherein said first file contains repeating data stored in successive rows, and wherein said servers traverse said first compressed file while said first compressed file is stored in memory to directly retrieve data stored in said first compressed file without decompressing said first compressed file, wherein said retrieved data is used to generate said analytical business report;

wherein said application controller distributes processing of said first file by creating sub-rowsets of said first file and by assigning said sub-rowsets of said first file to a first set of servers, wherein said first set of servers identify unique partition values in said sub-rowsets of said first file and merges said unique partition values identified by said first set of servers and transmits said merged partition values to a second set of servers; and wherein said second set of servers process sub-rowsets of said second file using said merged partition values to create partial result sets and wherein said second set of servers transmit said partial result sets to said application controller.

8. The system of claim 7 wherein said first file is compressed using run length encoding.

9. The system of claim 7 wherein said application controller divides at least one of said first and second files into sub-rowsets and assigns said sub-rowsets to said servers for processing.

10. The system of claim 7 wherein said application controller distributes processing of said first file by creating sub-rowsets of said first file and by assigning said sub-rowsets of said first file to a first set of servers.

11. The system of claim 7 wherein said application controller merges said partial result sets into a complete result set.

12. The system of claim 11 wherein said application controller annotates said complete result set and transmits said complete result set to said client computer.

13. The system of claim 7 wherein said application controller receives said requests from said client computer via a browser run by said client computer.

14. The system of claim 7 further comprising a web application server connected to a plurality of application controllers, wherein said web application server distributes said requests to said plurality of application controllers using dynamic binding.

15. The system of claim 7 wherein said application controller includes a distribution analysis module that determines a number of servers required to process said request within interactive time.

16. A method for providing an analytical business report that is based on data that includes tables each with a plurality of data fields, comprising the steps of:

inverting said data such that said data fields of said tables in said data are stored in files that contain a row number and a data field;

compressing at least one of said files;

distributing processing of said business report using a first set of severs; and traversing said compressed file while said compressed file is stored in memory to directly retrieve data stored in said compressed file without decompressing said compressed file, wherein said retrieved data is used to generate said analytical business report;

wherein a first file includes a partition field and a second file includes an analytical field;

further comprising the steps of dividing rows of said first file into sub-rowsets;

assigning said sub-rowsets to said first set of servers to determine unique partition values;

merging said unique partition values generated by said first set of servers;

distributing a control structure related to said unique partition values to a second set said servers;

dividing rows of said second file into sub-rowsets;

assigning said sub-rowsets to said second set of servers; and calculating partial result sets using said control structure, said analytical values and said unique partition values in said second set of servers.

17. The method of claim 16 further comprising the step of:

determining a number of servers in said first set that are required to process said request in interactive time.

18. The method of claim 16 further comprising the step of:

merging said partial result sets from said second set of servers into a complete result set;

annotating said complete result set; and transmitting said complete result set to a client computer.

\* \* \* \* \*